United States Patent [19]

Behrens

[11] 3,939,128

[45] *Feb. 17, 1976

[54] VULCANIZATION OF HALOGEN OR EPOXY-CONTAINING POLYACRYLATE ELASTOMERS

[75] Inventor: Rudolf Adolf Behrens, Gladstone, N.J.

[73] Assignee: American Cyanamid Company, Stamford, Conn.

[ * ] Notice: The portion of the term of this patent subsequent to July 17, 1990, has been disclaimed.

[22] Filed: July 11, 1973

[21] Appl. No.: 378,084

Related U.S. Application Data

[63] Continuation of Ser. No. 158,601, June 30, 1971, abandoned.

[52] U.S. Cl..... 260/79.5 P; 260/23 AR; 260/31.2 R; 260/42.29; 260/79.5 R; 260/89.5 H; 260/89.5 S

[51] Int. Cl.$^2$.......................................... C08F 28/02

[58] Field of Search........ 260/2 EC, 23 AR, 89.5 H, 260/89.5 S, 23.7 M, 23.7 H, 784, 775, 79.5 R, 79.5 P

[56] References Cited

UNITED STATES PATENTS

| | | | |
|---|---|---|---|
| 3,450,681 | 6/1969 | Gobran et al. | 260/80.72 |
| 3,458,461 | 7/1969 | Mihal | 260/23 AR |
| 3,493,548 | 2/1970 | Chalmers | 260/79.7 |
| 3,506,624 | 4/1970 | Behrens | 260/78.4 D |
| 3,607,847 | 9/1971 | Troussier | 260/86.1 E |
| 3,746,674 | 7/1973 | Behrens | 260/79.5 R |

*Primary Examiner*—Ronald W. Griffin
*Attorney, Agent, or Firm*—Charles J. Fickey

[57] ABSTRACT

A vulcanization composition is provided which comprises a halogen- or epoxy-containing polyacrylate elastomer from about 0.05 to 2.5 parts of sulfur and from about 0.5 to 7 parts of either a sodium or potassium salt of 2-ethylhexanoic acid. In addition, an improved process for vulcanizing the elastomers is provided which comprises adding such sulfur and 2-ethylhexanoic acid salts to the polymer.

14 Claims, No Drawings

VULCANIZATION OF HALOGEN OR EPOXY-CONTAINING POLYACRYLATE ELASTOMERS

This is a continuation of application Ser. No. 158,601, filed June 30, 1971, now abandoned.

Generally stated the subject matter of the present invention relates to an improved vulcanization system for halogen or epoxy-containing polyacrylate elastomers. More particularly, the invention relates to an improved vulcanization system comprising sulfur and an alkali metal salt of 2-ethylhexanoic acid.

BACKGROUND OF THE INVENTION

Vulcanization systems comprising sulfur and an alkali metal salt of an organic carboxylic acid, hereinafter referred to as a soap and sulfur cure system, were originally disclosed and claimed in U.S. Pat. No. 3,458,461 issued on July 29, 1969 to F. F. Mihal. This soap and sulfur cure system provided better mold release, reduced corrosion of molds, better economy, freedom from offensive fumes and vapors, optional elimination of post-curing and excellent bin stability.

An improvement in the soap and sulfur cure system was disclosed in U.S. Pat. No. 3,506,624 issued on Apr. 14, 1970 to R. A. Behrens. The improvement comprised the utilization of a combination of sulfur, an alkali metal salt of an organic carboxylic acid and an N-substituted -mono or bis-maleimide. This system provided the additional advantages of improved processing safety and good cure rate.

The present invention represents the culmination of a long series of investigations conducted largely by the inventor and his associates directed to improving the soap and sulfur cure system.

Accordingly, it is a primary object of this invention to provide a new and improved soap and sulfur cure system for vulcanizing particular synthetic elastomeric polymers. Another object of this invention is to provide a soap and sulfur cure system which has a faster cure rate.

Additional objects and advantages will be set forth in part in the description which follows, and in part will be obvious from the description or may be learned by the practice of the invention, the objects and advantages being realized and attained by means of compositions and improvements, particularly pointed out in the appended claims.

THE INVENTION

To achieve the foregoing objects and in accordance with its purposes, as embodied and broadly described the present invention provides an improved vulcanization composition comprising a halogen or epoxy-containing polyacrylate elastomer, 0.05 to 2.5 parts of sulfur and from about 0.5 to 7 parts of either a sodium or potassium salt of 2-ethylhexanoic acid per 100 parts by weight of a particular synthetic elastomeric polymer.

The invention also provides an improved process for vulcanizing halogen or epoxy-containing polyacrylate elastomers which comprises adding to the elastomer prior to vulcanization from about 0.05 to 2.5 parts of sulfur and from about 0.5 to 7 parts of either a sodium or potassium salt of caprylic acid based on 100 parts by weight of said elastomer.

The invention constitutes the novel methods, processes, steps and improvements herein shown and described.

It is to be understood that both the foregoing general description and the following detailed description are exemplary and explanatory and are not restrictive of the invention.

The present invention resides in the discovery that the combination of sulfur with either a sodium or potassium 2-ethylhexanoate provides a substantially increased cure rate of the synthetic elastomeric polymers.

As employed in the instant specification and claims, the term halogen or epoxy-containing polyacrylate elastomer is defined to comprise the following:

The halogen-containing acrylate polymers, which are typically copolymers of an alkyl acrylate, particularly a lower alkyl acrylate, and a minor amount of a compatible vinyl or allyl monomer containing a halogen atom, generally a chlorine atom. These include copolymers of one or more lower alkyl acrylates with a halogen-containing monomer; copolymers of one or more alkyl acrylates with other compatible acrylate monomers, including alkoxyalkylacrylates, thioalkylacrylates, alkylthioalkyl acrylates, alkoxythioalkyl acrylates, cyanoalkyl acrylates, cyanoalkoxyalkyl acrylates, cyanothioalkyl acrylates, with a halogen-containing monomer; and copolymers of the above with other compatible vinyl monomers, such as acrylonitrile, with a halogen-containing monomer.

The acrylic acid component of the composition comprises one or more lower alkyl acrylates, i.e., esters of acrylic acid and an alcohol containing from about 1 to 8 carbon atoms, such as methyl, ethyl, n-butyl, n-hexyl and n-octylacrylates.

The compatible halogen-containing, preferably chlorine-containing comonomers include vinyl chloroacetate, vinyl chloropropionate, allyl chloropropionate, 2-chloroethyl vinylether, 2-chloroethylacrylates, and the like, and chlorine containing monomers having the formula:

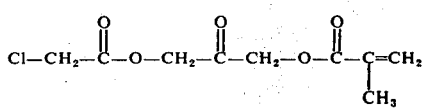

and

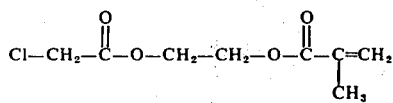

Also included are the chloroprene elastomers, including not only polymers of 2-chloro-1,3-butadiene, but also copolymers thereof with vinyl or diene monomers wherein chloroprene is the predominant monomer.

Lastly, the epoxy-containing acrylate elastomers, including both homopolymers and copolymers, of one or more copolymerizable monomers, such as ethyl acrylate, allyl glycidyl ether and glycidyl methacrylate are included.

Examples of useful copolymers include those of ethylacrylate and about 5 weight percent of chloroethyl vinylether, copolymers of ethylacrylate and about 5 weight percent of 2-chloroethylacrylate, and copolymers of about 70 weight percent or more of ethylacrylate and up to 15 weight percent of vinylchloroacetate. Particularly effective applications of this invention are in the vulcanization of copolymers of ethyl acrylate and vinyl chloroacetate (the product of copolymerization of about 5% vinylchloroacetate and 95% ethylacrylate); copolymers of ethyl and butylacrylate, methoxyethyl or ethoxyethyl acrylate and vinylchloroacetate; and copolymers of butyl acrylate, cyanoethyl acrylate and vinyl chloroacetate. Normally, the halogen or epoxy-containing monomer represents a minor proportion of the total monomer mixture, for example, up to about 10% by weight.

The halogen and epoxy groups in the polymers hereinabove defined are sometimes described as active groups when referring to elastomeric polymers. The reason for this is that it is known in the art that polymers containing such groups are more readily vulcanized, thereby permitting vulcanization of specialty formulations not ordinarily easily vulcanizable. Such elastomers are of particular interest because of their outstanding resistance to deterioration due to heat. They perhaps have the best such properties of all commercial rubbers, except for some silicones and some highly fluorinated elastomers made for special applications. The polymers are also highly resistant to flexural breakdown, compression set, ozone, ultraviolet light, mineral oils and gas diffusion.

Vulcanization according to the present invention comprises mixing the unvulcanized elastomer with sulfur, the sodium or potassium salt of 2-ethylhexanoic acid and other additives. The compounding can be done on a rubber mill by standard procedures. The compounded rubber is then cured at an elevated temperature, as in a heated mold.

The amount of sulfur used should be between 0.05 and 2.5%, preferably between 0.2 and 1%, based on the weight of the elastomer.

The amount of sodium or potassium 2-ethylhexanoate used should be between 0.5 and 7%, preferably between 2 and 5%, based on the weight of the elastomer.

When a maleimide is used in conjunction with sulfur and the alkali metal salt of 2-ethylhexanoic acid, the amount may vary over a wide range, depending on the particular application for which the system is designed. Normally, the maleimide will be used in a range of from about 0.25 and 5%, preferably 0.5 to 1.5% by weight, based on the weight of the elastomer. Generally, as the amount of maleimide is increased the rate of cure and level of cure are increased with at most only a slight decrease in the processing safety, the amount of sulfur and alkali metal 2-ethylhexanoate remaining constant.

Additives normally used in compounding elastomers may be added at the time of compounding the elastomer. These include carbon black, other fillers, pigments, antioxidants, stabilizers, and other conventional materials. Organic acids, such as stearic acid, are sometimes added to retard the cure, thereby providing an additional measure of control of the cure rate.

As employed in the instant specification and claims all parts are expressed as parts by weight and are based on 100 parts of the synthetic elastomeric polymer.

The following examples are provided for illustrative purposes and may include particular features of the invention. However, the examples should not be construed as limiting the invention, many variations of which are possible without departing from the spirit or scope thereof.

EXAMPLE I

A base formula was prepared as follows:

|  | Parts |
| --- | --- |
| Elastomer (1) | 400 |
| FEF carbon black | 240 |
| Stearic acid | 8 |
| Antioxidant (2) | 8 |
| Sulfur | 1.2 |

(1) 94% of a mixture of 85 parts ethyl acrylate and 15 parts butyl acrylate copolymerized with 6% vinyl chloroacetate
(2) Di-beta-napthyl-p-phenylene diamine The above composition was divided into four equal parts and compounded as follows:

|  | Parts by Weight | | | |
| --- | --- | --- | --- | --- |
|  | A | B | C | D |
| Sodium oleate | 3.5 | — | — | — |
| Ivory beads (3) | — | 3.5 | — | — |
| Sodium and potassium stearates (2:1) | — | — | 3.5 | — |
| Sodium 2-ethylhexanoate | — | — | — | 3.5 |
| (3) Mainly sodium stearate; analysis shows 8.36%Na, 0.26%K | | | | |
| Stress-Strain properties: cured 15 minutes at 330°F. | | | | |
| Modulus at 100%, psi | 650 | 550 | 650 | 1200 |
| Tensile, psi | 1500 | 1450 | 1460 | 1700 |
| Elongation,% | 270 | 290 | 260 | 150 |
| Shore A hardness | 70 | 69 | 72 | 75 |

The above data illustrates that sodium 2-ethylhexanoate is faster curing than sodium oleate, sodium stearate, or mixtures of sodium and potassium stearates. The vulcanizate attains a higher state of cure in the same time period, as indicated by the higher modulus, higher tensile, lower elongation at break and higher hardness.

EXAMPLE II

To a base formulation prepared as follows:

|  | Parts |
| --- | --- |
| Elastomer of Ex. 1 | 100 |
| FEF carbon black | 60 |
| Stearic acid | 0.5 |
| Sulfur | 0.25 | was added 4.0 parts of sodium 2-ethylhexanoate; to a similar composition was added 4.0 parts of sodium oleate. The two compositions were compounded on a standard two-roll rubber mill and cured in a mold for 15 minutes at 330°F.

| Monsanto Oscillating Disc Rheometer at 330°F. | | |
| --- | --- | --- |
|  | A | B |
| Maximum cure rate | 4.4 | 0.9 |
| Rise in torque during 5 min. (in. lbs.) | 24 | 4 |
| Stress-strain properties: cured 15 minutes at 330°C. | | |
| Modulus at 100%, psi | 1250 | 910 |
| Tensile, psi | 1760 | 1750 |
| Elongation,% | 140 | 190 |
| Shore A hardness | 65 | 68 |

The above data show that sodium 2-ethylhexanoate is almost 5 times as fast curing as sodium oleate, achieving 6 times the rise in torque during the same period of time. The stress-strain properties indicate that sodium 2-ethylhexanoate attains a higher state of cure than sodium oleate.

EXAMPLE III

Compositions were prepared as follows:

|  | A | B | C | D |
|---|---|---|---|---|
| Elastomer* | 100 | 100 | 100 | 100 |
| FEF Carbon black | 60 | 60 | 60 | 60 |
| Antioxidant** | 2 | 2 | 2 | 2 |
| Stearic acid | 2 | 2 | 2 | 2 |
| Sulfur | 0.3 | 0.3 | 0.3 | 0.3 |
| Sodium 2-ethylhexanoate*** | 4 | — | — | — |
| Potassium stearate | — | 4 | — | — |
| Sodium stearate | — | — | 4 | — |
| Sodium oleate | — | — | — | 4 |

*95% ethyl acrylate - 5% vinylchloroacetate
**Di-β-naphthyl-p-phenylenediamine
***5.7 parts of a 70% solution in water The above compositions were compounded on a standard two-roll rubber mill and cured for 10 minutes at 330°F.

| Stress-Strain Properties | A | B | C | D |
|---|---|---|---|---|
| Modulus at 100%, psi | 1280 | 795 | 500 | 650 |
| Tensile, psi | 1910 | 1900 | 1480 | 1560 |
| Elongation,% | 160 | 250 | 360 | 210 |
| Shore A hardness | 72 | 68 | 70 | 67 |
| Monsanto Oscillating Disc Rheometer at 330°F. | | | | |
| Max. Cure Rate | 4.1 | 3.1 | 0.9 | 1.4 |
| Time to 90% full cure min. | 17 | 20 | 32.5 | 28.5 |
| Max. Torque (in. lbs.) | 65 | 42 | 42 | 47.5 |

The stress-strain data indicate that composition A attains a higher state of cure than B, C or D in the same period of time, as shown by the higher modulus, higher tensile, lower elongation and higher hardness. The Rheometer data show a much faster rate of cure for A and a higher state of cure in a shorter time.

EXAMPLE IV

The following compositions were prepared:

|  | A | B |
|---|---|---|
| Elastomer* | 100 | 100 |
| FEF Carbon black | 60 | 60 |
| Antioxidant** | 2 | 2 |
| Stearic acid | 2 | 2 |
| Sulfur | 0.3 | 0.3 |
| Sodium 2-ethylhexanoate*** | 4 | — |
| Sodium stearate | — | 4 |

*42% ethylacrylate - 29% butylacrylate - 23% methoxyethyl-acrylate - 6% vinylchloroacetate
**Di-β-napthyl-p-phenylene diamine
***5.7 parts of a 70% solution in water The compositions were compounded on a standard two-roll mill and cured for 10 minutes at 330°F.

| Stress-strain properties | A | B |
|---|---|---|
| Modulus at 100%, psi | 1125 | 290 |
| Tensile, psi | 1610 | 1005 |
| Elongation,% | 150 | 340 |
| Shore A hardness | 70 | 60 |
| Monsanto Oscillating Disc Rheometer at 330°F. | | |
| Maximum Cure Rate | 3.0 | 0.5 |
| Time to 90% full cure, min. | 17.5 | 42.5 |
| Maximum Torque (in. lbs.) | 56 | 32 |

Both stress-strain data and Rheometer confirm that A is faster curing than B and attains a higher state of cure in a shorter time.

What is claimed:

1. A vulcanizable halogen or epoxy-containing polyacrylate elastomer composition comprising, for each 100 parts by weight of said elastomer, from about 0.05 to 2.5 parts of sulfur and from about 0.5 to 7 parts by weight of either the sodium or potassium salt of 2-ethylhexanoic acid.

2. A composition according to claim 1 wherein the elastomer is a halogen-containing acrylate polymer.

3. A composition according to claim 1 wherein the elastomer is an epoxy-containing polyacrylate elastomer.

4. A composition according to claim 1 wherein the 2-ethylhexanoic acid salt is the sodium salt.

5. A composition according to claim 1 wherein the 2-ethylhexanoic acid salt is the potassium salt.

6. A composition according to claim 1 wherein the elastomer is a copolymer of at least one lower alkyl acrylate, said alkyl having from about 1 to 8 carbon atoms and vinyl chloroacetate.

7. A composition according to claim 1 wherein the elastomer is a copolymer of ethyl acrylate and vinyl chloroacetate.

8. A composition according to claim 1 wherein the elastomer is a terpolymer of ethyl acrylate, butyl acrylate and vinyl chloroacetate.

9. A composition according to claim 1 wherein the elastomer is a copolymer of at least one alkylacrylate, an alkoxyalkylacrylate and vinylchloroacetate.

10. A composition according to claim 1 wherein the elastomer is a copolymer of ethylacrylate, butyl acrylate, methoxy- or ethoxyethylacrylate and vinylchloroacetate.

11. A composition according to claim 1 comprising from about 0.25 to 5 parts by weight, based on the weight of the elastomer, of an N-substituted mono- or bis maleimide.

12. A composition according to claim 11 wherein the N-substituted maleimide is phenylene 1,3-maleimide.

13. A composition according to claim 11 wherein the N-substituted maleimide is N-phenyl maleimide.

14. In a process for vulcanizing a halogen or epoxy-containing polyacrylate elastomer, the improvement which comprises adding to the elastomer prior to vulcanization from about 0.05 to 2.5 parts of sulfur and from about 0.5 to 7 parts of either a sodium or potassium salt of 2-ethylhexanoic acid based on 100 parts by weight of said elastomer.

* * * * *